US011222482B2

(12) United States Patent
Stancato et al.

(10) Patent No.: US 11,222,482 B2
(45) Date of Patent: Jan. 11, 2022

(54) SYSTEM AND METHOD FOR AN INTEGRATED PARKING MANAGEMENT SYSTEM

(71) Applicants: Enzo Stancato, West Palm Beach, FL (US); Anthony Godfrey Nedd, Marlow (GB)

(72) Inventors: Enzo Stancato, West Palm Beach, FL (US); Anthony Godfrey Nedd, Marlow Bottom (GB)

( * ) Notice: Subject to any disclaimer, the term of this patent is extended or adjusted under 35 U.S.C. 154(b) by 1701 days.

(21) Appl. No.: 14/525,990

(22) Filed: Oct. 28, 2014

(65) Prior Publication Data
US 2016/0117866 A1  Apr. 28, 2016

(51) Int. Cl.
| G07B 15/00 | (2011.01) |
| G06Q 10/02 | (2012.01) |
| G06Q 30/02 | (2012.01) |
| G06Q 50/00 | (2012.01) |
| H04L 12/58 | (2006.01) |
| G07C 9/00 | (2020.01) |
| H04L 12/18 | (2006.01) |

(52) U.S. Cl.
CPC ............ G07B 15/00 (2013.01); G06Q 10/02 (2013.01); G06Q 30/0261 (2013.01); G06Q 50/01 (2013.01); G07C 9/00896 (2013.01); H04L 12/1895 (2013.01); H04L 51/32 (2013.01)

(58) Field of Classification Search
CPC .... G07B 15/00; G06Q 10/02; G06Q 30/0261; G06Q 50/01; G07C 9/00896; H04L 12/1895; H04L 51/32
See application file for complete search history.

(56) References Cited

U.S. PATENT DOCUMENTS

| 6,559,776 B2 | 5/2003 | Katz |
| 9,965,902 B2* | 5/2018 | Wenninger ............. G07B 15/04 |
| 2002/0008639 A1 | 1/2002 | Dee |
| 2008/0270227 A1 | 10/2008 | Al Amri |
| 2010/0280941 A1 | 11/2010 | Masson et al. |
| 2011/0068165 A1* | 3/2011 | Dabosville ............ H04L 9/3263 |
| | | 235/375 |

(Continued)

FOREIGN PATENT DOCUMENTS

WO  2014/033727 A1  3/2014

OTHER PUBLICATIONS

Anonymous, "Global light vehicle OE connectivity market—forecasts to 2029," just-auto, 1,8-128, Bromsgrove, Aroq Limited, Jul. 2014.*

Primary Examiner — Nathan Erb
(74) Attorney, Agent, or Firm — JCIP Global Inc.

(57) ABSTRACT

The present invention relates to an integrated parking management system for automated parking identification, parking fee payment and parking status monitoring comprising: an in-vehicle unit configured to determine a geographic position of a vehicle; a parking management server configured to determine an available parking space and corresponding parking fee based on the geographic position data received from the in-vehicle unit. The system further comprises a handheld unit configured to determine validity of a parking status of the vehicle, and report to the parking management server. The functions of the In Vehicle Unit can also be realized in a software only implementation for integration and execution on alternative platforms.

19 Claims, 18 Drawing Sheets

(56) References Cited

U.S. PATENT DOCUMENTS

| | | | |
|---|---|---|---|
| 2011/0140927 A1* | 6/2011 | Lee | G08G 1/207 340/993 |
| 2011/0276370 A1* | 11/2011 | Agrait | G08G 1/14 705/13 |
| 2012/0053998 A1 | 3/2012 | Redmann et al. | |
| 2012/0092191 A1* | 4/2012 | Stefik | G08G 1/148 340/932.2 |
| 2012/0286972 A1 | 11/2012 | Bouzaglo | |
| 2012/0310712 A1 | 12/2012 | Baughman et al. | |
| 2013/0124270 A1* | 5/2013 | Tziperman | G07B 15/02 705/13 |
| 2013/0282448 A1 | 10/2013 | Rydbeck et al. | |
| 2015/0095123 A1* | 4/2015 | Wenninger | G07B 15/00 705/13 |
| 2015/0134454 A1* | 5/2015 | Sandbrook | G06Q 30/0261 705/14.58 |
| 2015/0179070 A1* | 6/2015 | Sandbrook | G08G 1/149 340/932.2 |
| 2016/0180712 A1* | 6/2016 | Rosen | G01C 21/36 705/5 |
| 2017/0018183 A1* | 1/2017 | Rosen | G08G 1/147 |
| 2017/0067747 A1* | 3/2017 | Ricci | G06F 3/0673 |
| 2017/0249626 A1* | 8/2017 | Marlatt | G06Q 20/3223 |

\* cited by examiner

SYSTEM AND METHOD FOR AN INTEGRATED PARKING MANAGEMENT SYSTEM

FIELD OF THE INVENTION

The present invention relates generally to vehicle parking payment and monitoring. More specifically, the present invention relates to an integrated system for vehicle parking identification, monitoring of valid parking and payment of parking fee.

BACKGROUND OF THE INVENTION

Vehicle parking has become a huge concern not only for the vehicle owners or users of the vehicle but also for the parking authorities and traffic enforcement authorities in managing parking. Public or private parking lots or parking buildings are constructed in the central area of a city or in the region having increasing traffic, such that multiple number of vehicles can be parked together in order to solve the parking difficulty. However, in such parking lots or parking building, there still exists numerous limitations in parking management such as wait time to get a parking spot, parking fee payment methods and need for parking attendants.

Vehicle parking along a street and revenue collection for parking is generally managed by installing parking meters at each parking spot. The parking meters permit the vehicles to be parked for an allowable period of time, typically determined by the amount of money inserted into the parking meter. The advent of electronic parking meters furthered the parking management efficiency by communicating to a parking authority via a centralized computer system.

Another method of paying for parking a vehicle in a public or private parking space involves issuing a prepaid parking receipt by a parking attendant on payment of a parking fee by the vehicle user. Monitoring of valid parking status of parked vehicles by parking authorities or parking attendants or traffic enforcement officials involves checking for display of a valid parking receipt on the parked vehicle. Entry/exit barrier systems which are used currently, also requires cash or credit card payment being made at the parking space.

Current parking management and associated billing systems are based on stand-alone technology which poses limitations including deployment of resources adding to overhead costs. Moreover individual systems for parking ticket issuance, parking status verification and billing or revenue collection renders parking management a tedious task.

U.S. patent publication US20020008639 shows a parking payment system with each user having a communications device to communicate with a central processing center. U.S. patent publication US20120310712 shows a parking management approach includes associating a payment source with a vehicle identifier. U.S. patent publication US20120286972 discloses a mobile parking management device and billing system. U.S. Pat. No. 8,279,088 discloses a system for parking management. PCT publication WO2006063079 shows a vehicle detector and vehicle parking management system.

In addition, conventional parking systems poses difficulties to vehicle users including finding available parking space, tedious payment process, identification of parked spot and extending parking duration. Furthermore, existing parking systems adds limitation to parking authority personnel in identification of invalid parking or parking beyond the time limit.

Therefore, there exists a need for an efficient method of accessing, managing municipal and privately owned vehicle parking thereby allowing vehicle users, parking attendants and parking facility authorities to accomplish parking management in a convenient and effective manner. An efficient parking management system would also reduce the resource and overhead costs involved in collecting parking fees, managing default notice issuance and enabling users to enjoy a prompt, cashless parking experience.

SUMMARY OF THE INVENTION

The present invention relates to an integrated parking management system for automated parking identification, parking fee payment and parking status monitoring comprising: an in-vehicle unit configured to determine a geographic position of a vehicle; a parking management server configured to determine an available parking space and corresponding parking fee based on the geographic position data received from the in-vehicle unit. The system further comprises a handheld unit configured to determine validity of a parking status of the vehicle, and report to the parking management server.

In an embodiment, the present invention relates to a method for automatic determination of a parking session, without requirement of user input, the method comprising:
  i) identifying a stationary state of a vehicle for a predetermined time by an in-vehicle unit;
  ii) reporting a geo-location of the vehicle to a parking management server, which confirms whether the geo-location is within a parking bay;
  iii) commencing and recording a valid parking session by the parking management server, if the vehicle is within the parking bay;
  iv) communicating a movement of the vehicle from the parking bay by the in vehicle unit; and
  v) terminating the parking session and calculating parking fee by the parking management server and communicating the calculated parking fee to the in-vehicle unit.

In another embodiment, the present invention relates to a method for automatically paying municipal charge and third party access charges for a vehicle including route toll charges or congestion zone entry charges, the method comprising:
  i) reporting a vehicle position to a parking management server by an in-vehicle unit; determining registered route access or municipal charge locality in the vicinity of the vehicle by the parking management server;
  ii) notifying zone entry charge to the in-vehicle unit upon entry of the vehicle into a chargeable zone based on user preference; and
  iii) automatic payment of the zone entry charge or notifying the user to pay the zone entry charge.

In another embodiment, the present invention relates to a method for monitoring validity of a parking session of a parked vehicle, the method comprising steps:
  i) establishing wireless communication with the in-vehicle unit of a parked vehicle by the handheld unit;
  ii) scanning vehicle registration data and checking for the presence of a valid parking session;
  iii) forwarding a parking default and vehicle registration data, on invalid parking session to the parking management server via mobile network module;

iv) retrieving vehicle user details by the parking management server upon receiving a notification on a parking default; and v) sending a parking default notice to the handheld unit, that is printed or mailed to the vehicle user.

DETAILED DESCRIPTION

Figure 1:
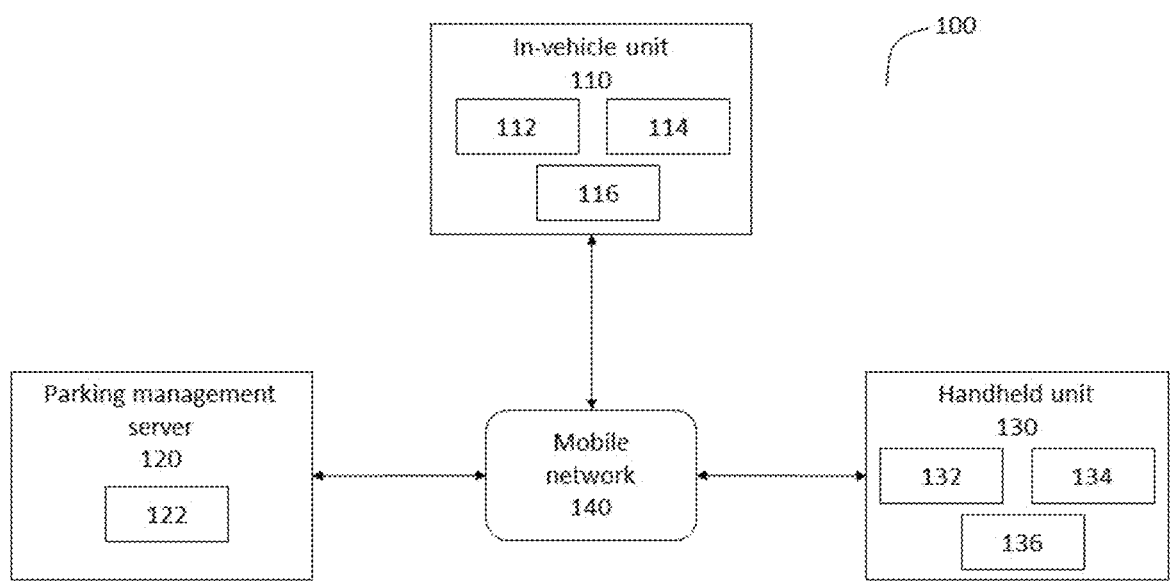
FIG. 1 illustrates a block diagram of a system for integrated parking management according to an embodiment of the present invention.

Referring to FIG. 1, the system 100 for integrated parking management for automated parking identification, parking fee payment and parking status monitoring comprises an in-vehicle unit 110 configured to determine a geographic position or geo-location of a vehicle. The in-vehicle unit 110 is installed in a vehicle, it comprises a GPS module 112 for determining the geographic position of the vehicle and a mobile network module 114, which is also used for geo-location identification when GPS is not available. The system 100 also comprises a parking management server 120 configured to determine an available parking spaces in the locality and its corresponding parking fee based on the geographic position data received from the in-vehicle unit 110. The system 100 further comprises a handheld unit 130 configured to monitor the validity of parking status of the vehicle, and report the parking status to the parking management server 120.

The in-vehicle unit 110 is installed within a vehicle, which communicates the geographic position data of the vehicle to the parking management server 120. In an embodiment, the parking management server 120 may also receive the geographic position data of the vehicle from a roadside parking beacon unit, which senses the vehicle arriving into, exiting from a parking space and also scans vehicle registration data. Upon receiving the geographic position data, the parking management server 120 enquires a database 122, which is dynamically updated with data related to parking spaces in a locality, availability status of parking spaces, parking tariff and communicates the resulting availability of parking space, corresponding parking fee data to the in-vehicle unit 110.

In an exemplary embodiment, the in-vehicle unit 110 comprises a portable device resembling a handheld mobile device that can be removably attached to a sun visor (using an in built clip), windshield (using a suction mount), and dash board (using a mounting bracket or a docking station). The portable mode or in-vehicle mode of the in-vehicle unit 110 is determined by docking station detection of in-vehicle unit 110 inserted within the vehicle. On removal of the in-vehicle unit 110 from the vehicle, it will establish a 3G/4G/5G connection with the parking management server 120. Furthermore, certain geographic location dependent detection methods will be temporarily suspended during portable mode of the in-vehicle unit 110.

The database 122, also comprises registered vehicle user details including user name, contact details, vehicle details, vehicle identification, registration details, payment method, user preferences and the like. Multiple users within a predetermined limit could also be registered for a given vehicle and alternatively multiple registered user details for multiple vehicles are stored in the database.

In an embodiment, the handheld unit 130 also comprises a GPS module 132 for determining the vehicle's geographic position, a mobile network module 134 for communicating with the parking management server 120. The handheld unit 130 may also comprise a wireless module 136 for establishing communication with a wireless module 116 of the in-vehicle unit 110.

The in-vehicle unit 110 comprises either a full graphics LCD display or a custom monochrome LCD display. In both cases an audio input to facilitate voice command input will be supported to allow hands free command and control of the in-vehicle unit. Onboard wireless module 116 allows connection to the vehicle audio system or a wireless headset when required. The in-vehicle unit 110 also comprises a route planning software module providing navigation direction to a chosen parking space or to a locality of advertisement venue through a graphical display or an audio instruction or its combination. The graphical display comprises full graphic LCD display or monochrome display. Navigation direction includes current vehicle position relevant information and relevant directions to a chosen destination with automatic provision of return directions.

Figure 2:
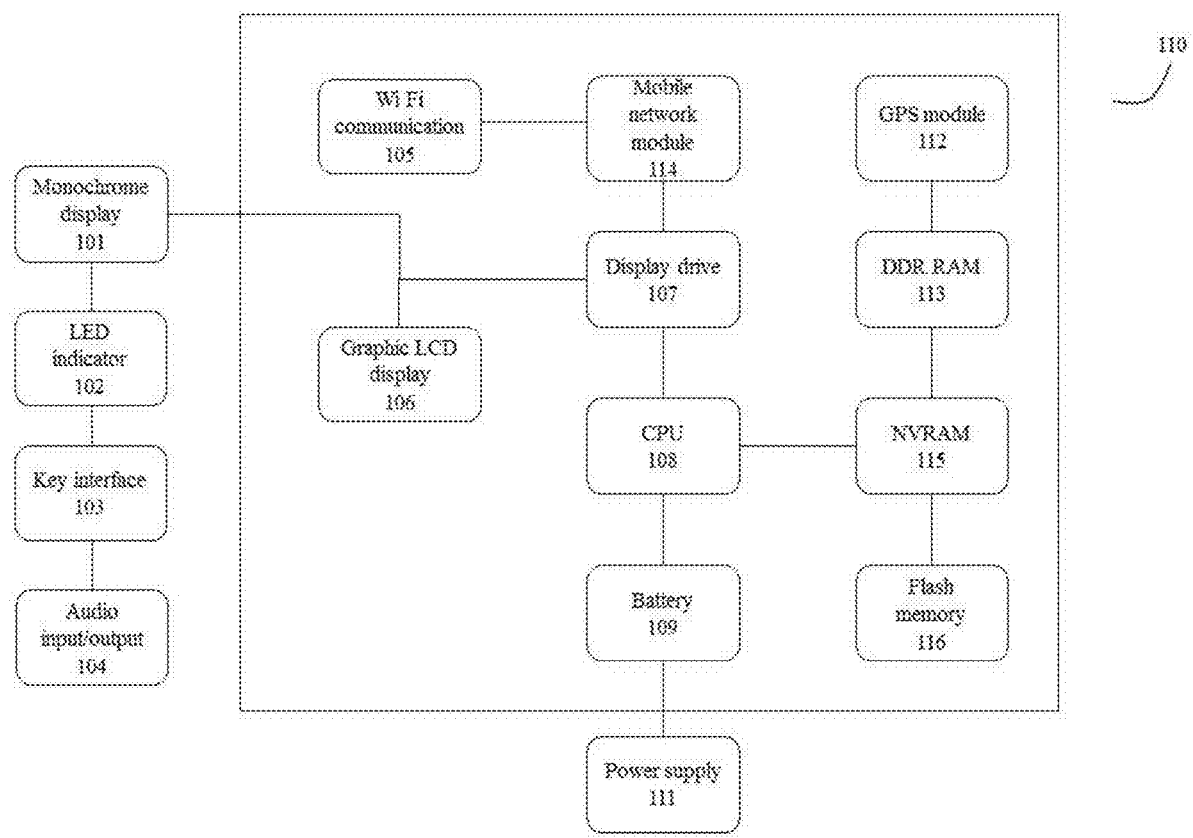
FIG. 2 illustrates a block diagram of an in-vehicle unit according to an embodiment of the present invention.

FIG. 2 shows components of the in-vehicle unit 110 which comprises a power supply and a display drive 107 operatively connected to monochrome display 101 or graphic LCD display 106. Input devices including key interface 103, audio input/output 104 and LED indicator 102 for indicating status of a task. In addition, a processing unit CPU 108 linked to a memory DDR RAM 113, NVRAM 115 and flash memory 116. The in-vehicle unit 110 further comprises Wi-Fi communication 105, mobile network 114 including 3G/4G/5G network module for communication and GPS module 112 that aids in identification of geographic position of the vehicle.

In an embodiment, the in-vehicle unit further comprises an emergency switch or a panic button, which on actuation, contacts the parking management server, reports the vehicle position and triggers the parking management server to call an emergency service provider or preset emergency contacts.

Figure 3:
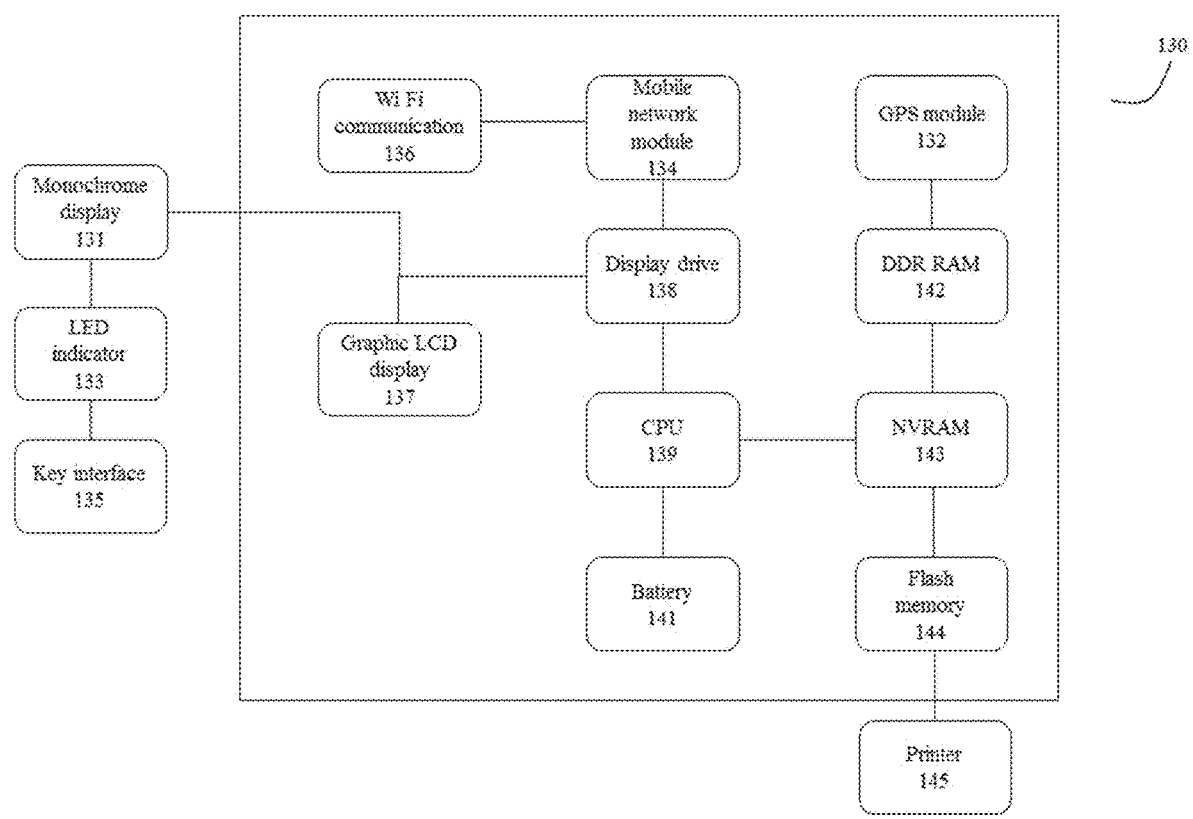
FIG. 3 illustrates a block diagram of a handheld unit according to an embodiment of the present invention.

FIG. 3 shows components of the handheld unit 130 which comprises a display drive 138 operatively connected to monochrome display 131 or a graphic LCD display 137. Input devices including key interface 135, audio input/output 104 and LED indicator 102 for indicating status of a task. In addition, a processing unit CPU 108 linked to a memory DDR RAM 113, NVRAM 115 and flash memory 116. The in-vehicle unit 110 further comprises Wi-Fi communication 105, mobile network 114 including 3G/4G/5G network module for communication and GPS module 112 that aids in identification of geographic position of the vehicle.

Figure 4:
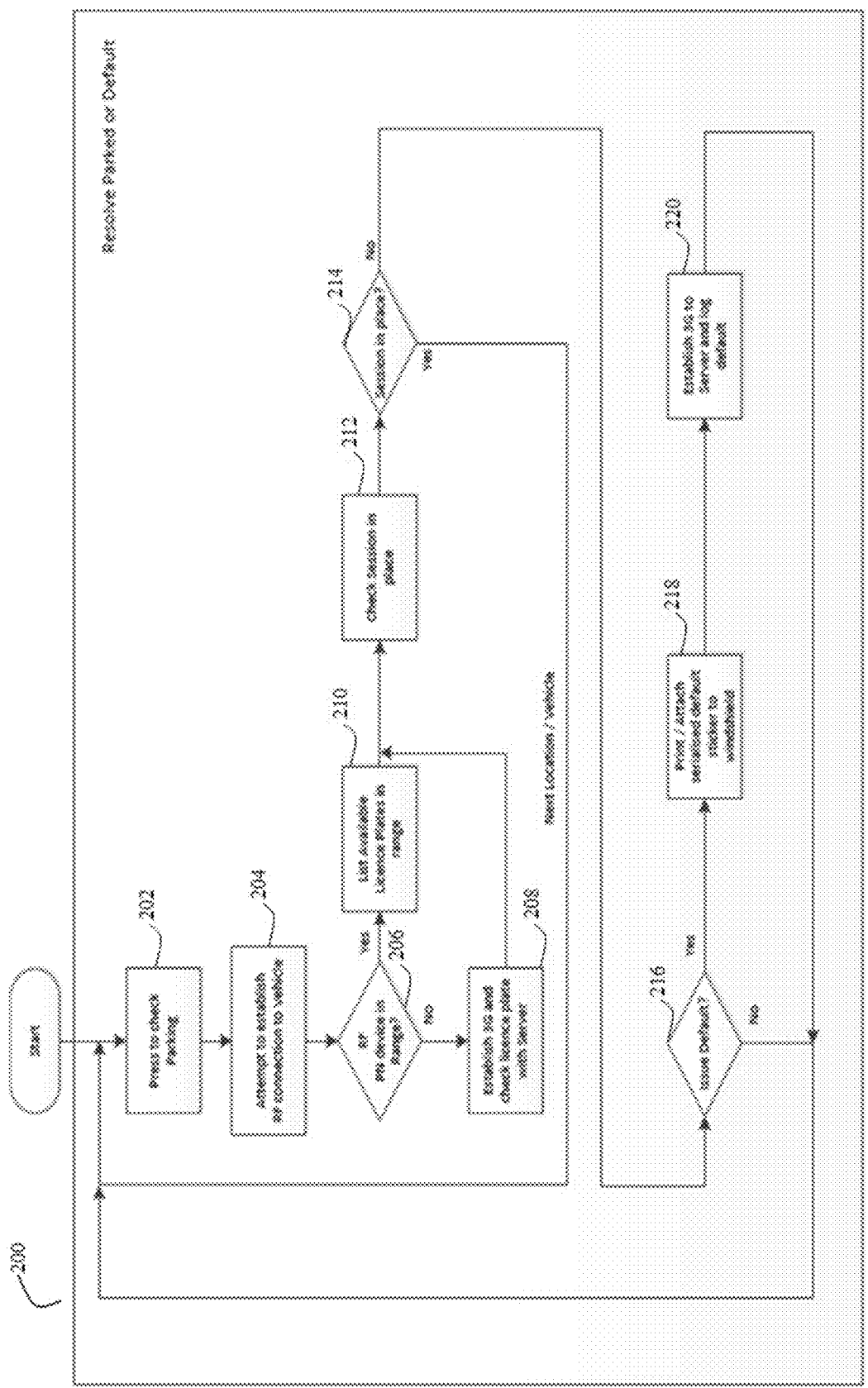
FIG. 4 shows a flow chart illustrating a method for monitoring the valid parking session of a vehicle using the handheld unit.

FIG. 4 shows a flow chart illustrating a method 200 for monitoring the parking status or valid parking session of a vehicle using a handheld unit. The method comprises actuating the handheld unit to check the parking status as shown in step 202; attempting to establish RF connection to the vehicle in the parking space as shown in step 204; checking RF in-vehicle device within detectable range as shown in step 206 and listing all available license plates of in-vehicle device installed vehicles within the detection range as shown in step 210, if no in-vehicle devices are within detectable range, a mobile network connection is established and license plate details are checked with the parking management server as shown in step 208; checking valid parking session of the listed vehicles as shown in steps 212, 214. If a valid parking session is not in place, issuing a parking default as shown in step 216. The method 200 further comprises printing and attaching serialized parking default sticker to the windshield of the vehicle without valid parking session as shown in step 218 and communicating the parking management server for logging the parking default incident by establishing a mobile network connection as shown in step 220.

In an embodiment, when no in-vehicle unit 110 is detected by the handheld unit 130, the parking attendant may manually enter license plate details or scan the vehicle license plate into the handheld unit 130. The handheld unit 130 will send the license plate details to the parking management server 120 in order to enquire with the database for vehicle details and validity of parking session. The parking management server 120 checks whether a valid parking session is in place. Where no valid parking session is reported, the parking attendant will confirm using the handheld Unit 130 that the vehicle is parked without a valid session. The handheld unit 130 will then report an occurrence of a parking default to the parking management server 120. The handheld unit 130 receives the vehicle registration data via an integrated scanning device or a license plate recognition system or by enquiring with the in-vehicle unit 110.

On receiving a default report from the handheld unit 130, the parking management server 120 issue a default notice to the registered user by the contact details held on the database 122 or to the vehicle owner where no registration is in place. As an option the Handheld Unit 130 is able to print a Default Notification sticker, which the parking attendant can affix to the vehicle windshield, advising the driver that a parking default has been recorded. In an embodiment, the parking management server 120 sends a request for removal of the vehicle to the handheld unit 110 upon confirmation of a parking default.

Figure 5:
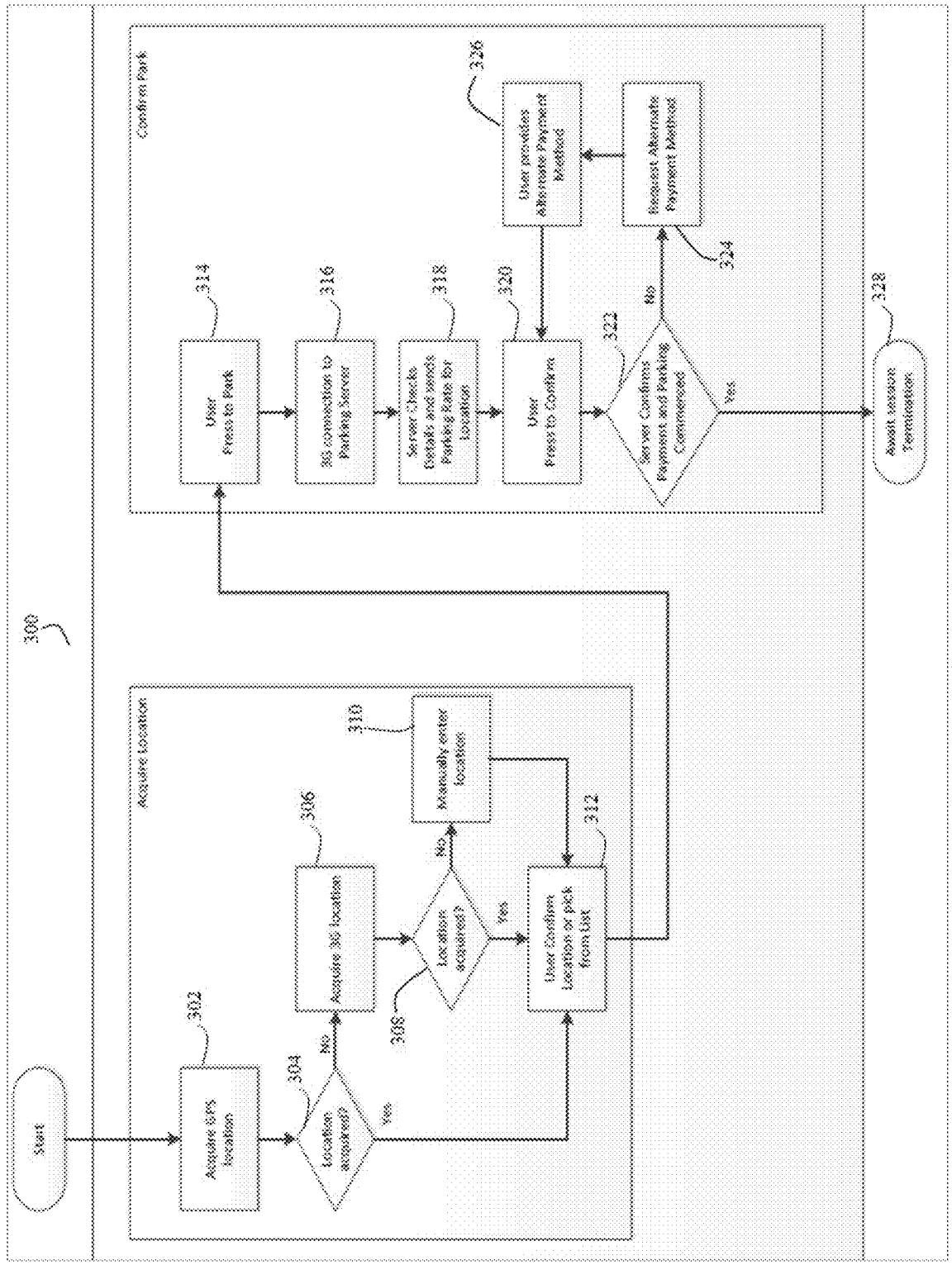
FIG. 5 shows a flow chart illustrating a method for vehicle parking enablement and parking fee payment using the in-vehicle unit.

FIG. 5 shows a flow chart illustrating a method 300 for vehicle parking enablement and parking fee payment using the in-vehicle unit. The method 300 comprises acquiring GPS location or geographic position of the vehicle, as shown in step 302; checking for acquired location status, as shown in step 304; connecting to a mobile network for identification of geographic position of the vehicle, if GPS location identification fails, as shown in step 306; checking again for acquired location status, as shown in step 308; if failed, manually entering the geographic position of the vehicle, as shown in step 310, user confirming the location identified by GPS or mobile network or manually entered location details, as shown in step 312; user confirming parking by actuating or pressing appropriate controls in the in-vehicle unit, as shown in step 314 and the in-vehicle unit establishing connection with the parking management server through mobile network, as shown in step 316; the parking management server checks the database for parking location, fee details and communicates to the in-vehicle unit, as shown in step 318; once the user confirms parking, as shown in step 320, the parking management server confirms payment and commences parking, as shown in step 322, if payment fails, requests for alternate payment mode, as in step 324, for the user to provide alternate payment, as in step 326; and once the parking commences, the server awaits termination of parking session, as shown in step 328.

In an embodiment, parking is automatically enabled upon sensing an arrival of the vehicle to a parking bay by a parking beacon and scanning of vehicle identification data for determining a registered user by the parking beacon. Upon receiving, the vehicle identification which is referenced against registered user data from the database, the parking management server automatically commences a valid parking session if vehicle identification data matches with a registered user. The parking beacon then communicates the movement of vehicle from the parking bay to the server, which terminates the parking session and calculates total parking fee and communicates the parking fee to the in-vehicle unit.

In an embodiment, the parking management server also sends notification or alert to the in-vehicle unit regarding non-availability of parking space or areas where parking is illegal or not permitted.

Figure 6:
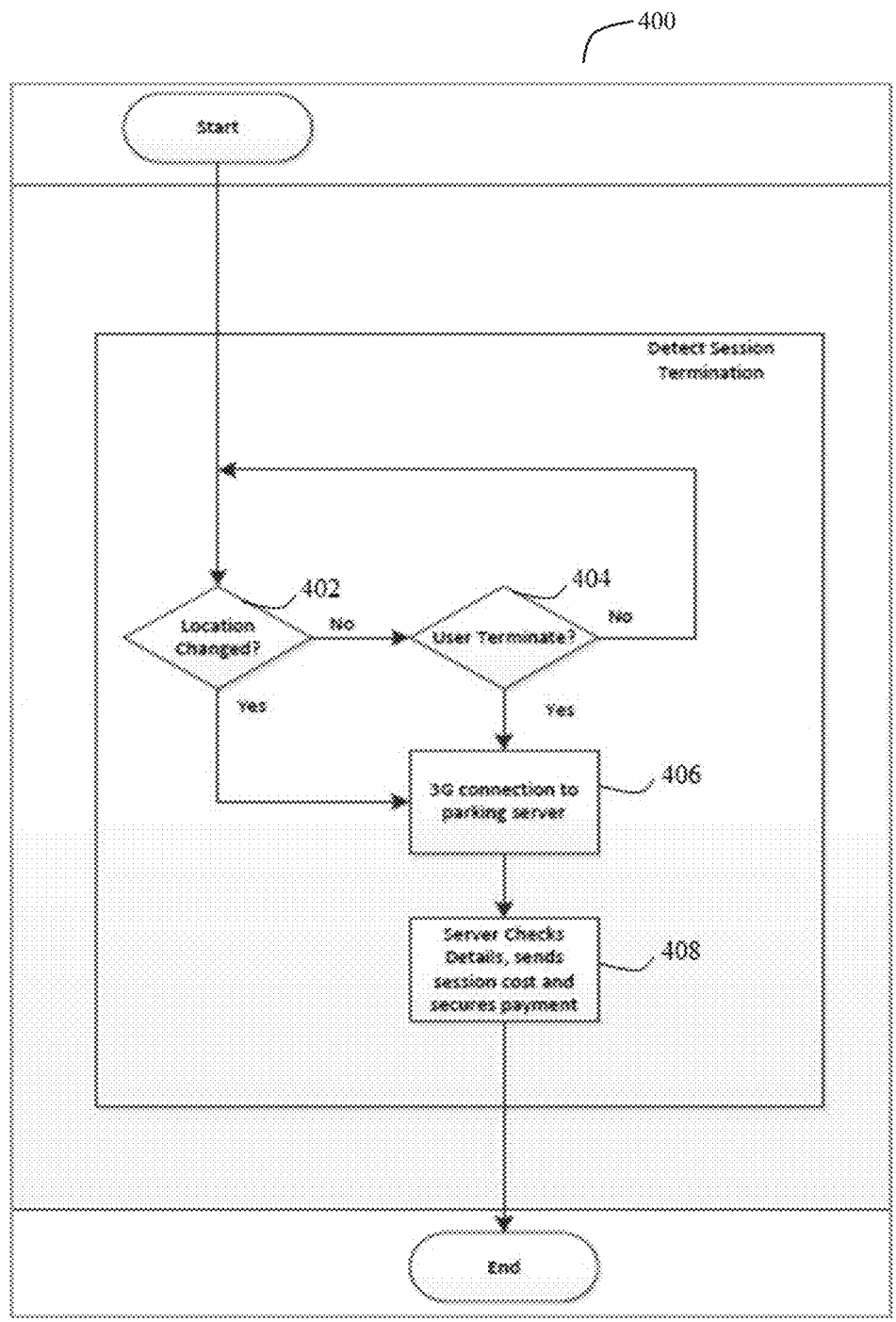
FIG. 6 shows a flow chart illustrating a method for automatic termination of a parking session by the in-vehicle unit.

FIG. 6 is a flow chart illustrating a method 400 for automatic termination of a parking session by the in-vehicle unit. The method comprises checking the change of vehicle location due to movement by the in-vehicle unit as shown in step 402; checking for user termination of the parking session as shown in step 404; upon termination by either of the above modes, communication is established to the parking management server via mobile network including 3G/4G/5G network as shown in step 406 and the server checks parking session termination details and sends session fee details for payment, secures payment from the user via the in-vehicle unit as shown in step 408.

Payment options include prepayment option, wherein, the parking management server provides the user a facility to add funds to an account to be utilized for future parking payments. A notification is sent to the user when residual funds fall below a pre-determined fund limit and user can automatically add funds via chosen payment method when funds fall below a pre-determined fund limit. On commencement of a parking session, the parking management server will check for funds available from the selected prepayment account and upon termination, the parking management server calculates total amount payable and secure funds from the account balance. The parking management server further processes the payment through a credit card or debit card transaction or through a registered payment service comprising PayPal, Faster Payments and similar payment services.

In an embodiment, the parking management server also facilitates payment by non-registered users by providing a contact number for calling and entering vehicle identification data and card payment data by the user. In addition, third party retailers may also provide parking management server access facilities such as enabling payments to be received from drivers or vehicle users by cash or other payment mode. The vehicle details will be recorded and forwarded to the parking management server thus registering a valid parking session at a parking space for a given period of parking purchased.

Figure 7:
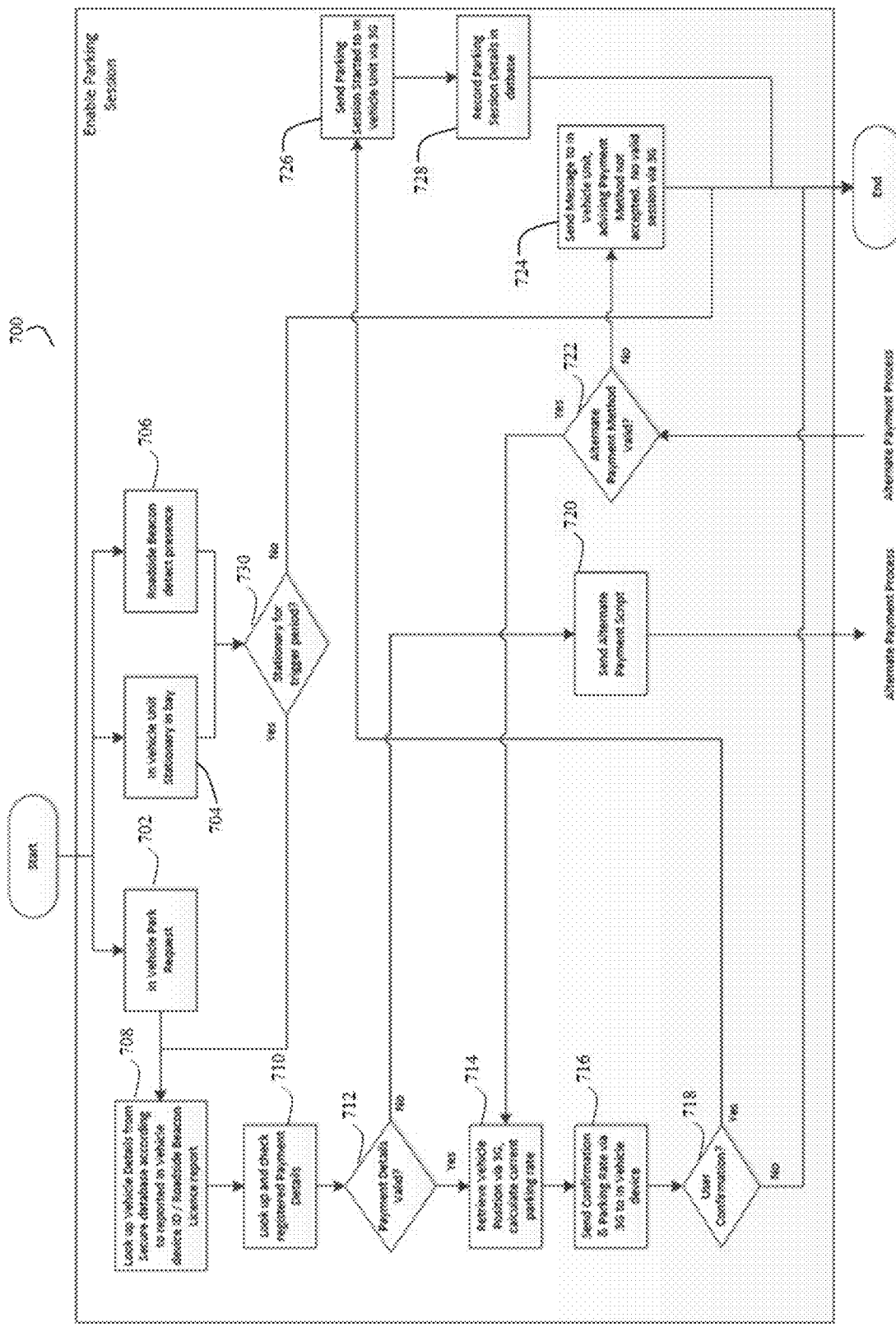
FIG. 7 shows a flow chart illustrating a method for automatic enabling of a parking session.

FIG. 7 shows a flow chart illustrating a method 700 for automatic enabling of a parking session. The parking session is automatically enabled either via a parking request initiated by the in-vehicle unit, as in step 702 or stationary state of vehicle detected by the in-vehicle unit, as in step 704 or by a roadside parking beacon 706. The duration of vehicle's stationary state is checked against a predetermined minimum time limit for triggering the parking session, as in step 730. If, the minimum time limit is reached, vehicle identification details are retrieved from the database based on in-vehicle ID or vehicle identification data received from the roadside parking beacon, as in step 708. Registered payment details are checked as in steps 710, 712, if payment details are not valid, alternate payment script is sent, as in step 720. Upon confirming valid payment details, the vehicle geographic position is reported via mobile network and current parking fee is calculated by the parking management server, as in step 714 and sending parking fee detail to the in-vehicle unit, as in step 716. On confirmation by the vehicle user, as in step 718, the parking session is initiated and communicated to the in-vehicle unit, as in step 726 and parking session details are recorded in the database, as in step 728. Further, alternate payment methods are also made available and checked for validity, as in step 722 and in case of invalid payment method, a message stating that 'payment method not accepted', therefore valid parking session not enabled is sent via the mobile network to the in-vehicle unit, as in step 724.

In an embodiment, the parking management server automatically enables parking session upon arriving in approved parking spaces in public places including parks, recreation, schools and also approved parking spaces in places such as restaurants, motels, hospitals and government office premises.

The integrated parking management system of the present invention facilitates automatically granting access to restricted or gated areas, such as gated communities, driveways and other similar restricted access areas. The in-vehicle Unit 110 will report a vehicle position to the parking management server 120 periodically, which determines that the location requires access to a restricted area and the parking management server 120 will check the user's registered details. If the user have the required access authority, the parking management server 120 will send the required access code to the target 'gateway' allowing entry without user intervention.

In another embodiment, the in-vehicle unit 110 on receiving the parking fee data, displays received data and prompt for user confirmation regarding parking and fee payment. The parking management server 120, upon confirmation from the in-vehicle unit 110, will check that the payment details held on the database 122 are valid and log the vehicle details, parking location and parking session commencement time. A confirmation that a valid parking session is in place is sent to the in-vehicle unit 110. The parking session is terminated by the in-vehicle unit 110 once the user returns to leave the parking space and parking session details are communicated to the parking management server 120, which calculates total parking session fee and returns the parking session fee details to the in-vehicle unit 110 for display and payment.

Figure 8:
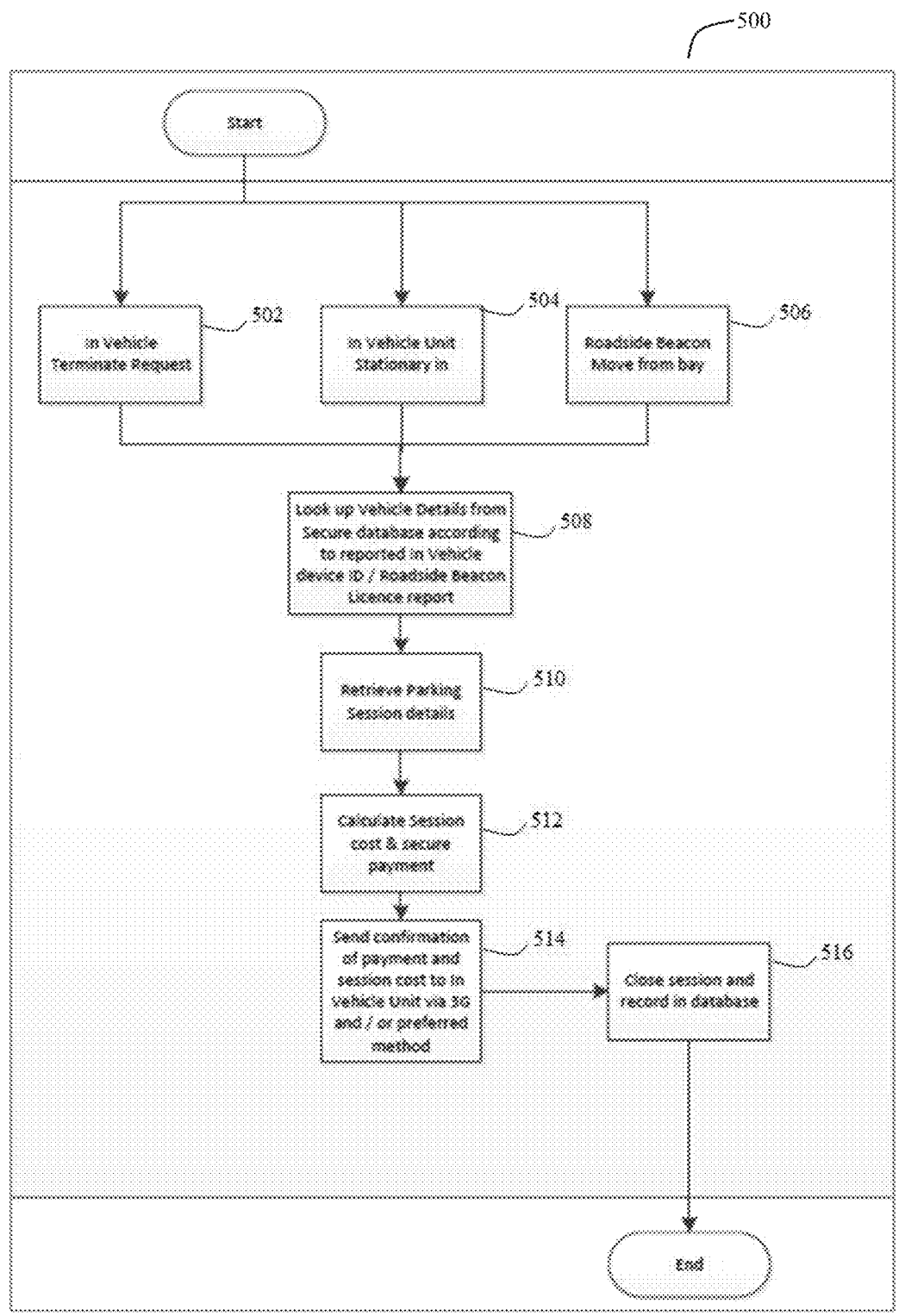
FIG. 8 shows a flow chart illustrating a method for automatic termination of a parking session.

FIG. 8 shows a flow chart illustrating a method 500 for automatic termination of a parking session. The method 500 comprises parking session termination request initiated either via a termination request initiated by the in-vehicle unit, as in step 502 or stationary state of vehicle in the parking space detected by the in-vehicle unit, as in step 504 or by a roadside parking beacon, as in step 506; checking vehicle details in the database based on communication received from the in-vehicle unit or roadside parking beacon, as in step 508 and retrieving parking session details, as in step 510. The parking management server further calculates parking session fee cost and secure payment from the in-vehicle unit, as shown in step 512. Sending confirmation of payment via mobile network, as in step 514; terminating the parking session and recording of session details in the database, as shown in step 516.

In an embodiment, the integrated parking management system allows automatic paying of municipal toll charge, third party route access charges and congestion zone entry charges. Upon receiving vehicle position data by the parking management server from the in-vehicle unit, registered third party route access or municipal toll charge locality in the vicinity of the vehicle is identified and listed by the parking management server. Notification of zone entry charge is sent to the in-vehicle unit upon entry of the vehicle into a chargeable zone based on user preference; and automatic payment of the zone entry charge is secured.

Figure 9:
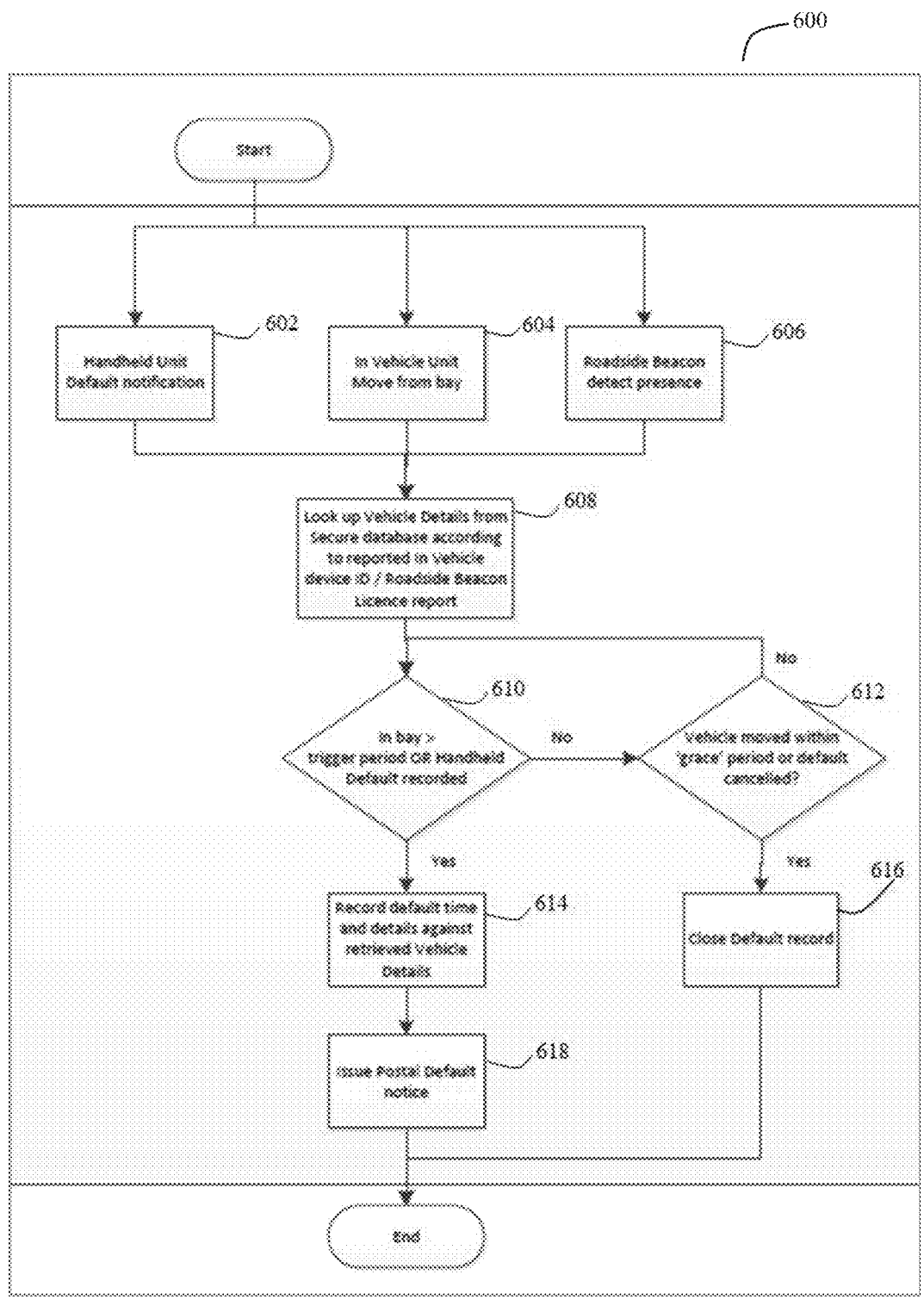
FIG. 9 shows a flow chart illustrating a method for identifying a parking default occurrence.

FIG. 9 shows a flow chart illustrating a method for identifying a parking default occurrence. The parking default is automatically initiated either via notification by the handheld unit as in step 602; geographic position of in-vehicle unit detected out of a parking space, as in step 604 or detection by a roadside parking beacon, as in step 606; checking vehicle details in the database based on communication received from the in-vehicle unit or roadside parking beacon, as in step 608; triggering a parking default if the vehicle is in the location greater than trigger period, as in step 610; parking default time and vehicle details are recorded in the database, as in step 614 and default notice issued, as in step 618. If the vehicle moves from the parked location within a grace period or during cancellation of default parking, as in step 612, the parking default is terminated, as in step 616.

In an embodiment, the parking management server 120 is also configured to utilize satellite imaging technology in order to determine when outdoor parking spaces are occupied. This facility is used to gather data in respect of free parking spaces available, in order to advise vehicle users wishing to park, or to log a vehicle detail in the database 122, when the vehicle is parked without a valid parking session in place. The parking management server 120 can advise parking attendants or parking authorities or parking enforcement personnel regarding such invalid parking by communicating through the handheld device 130.

Figure 10:
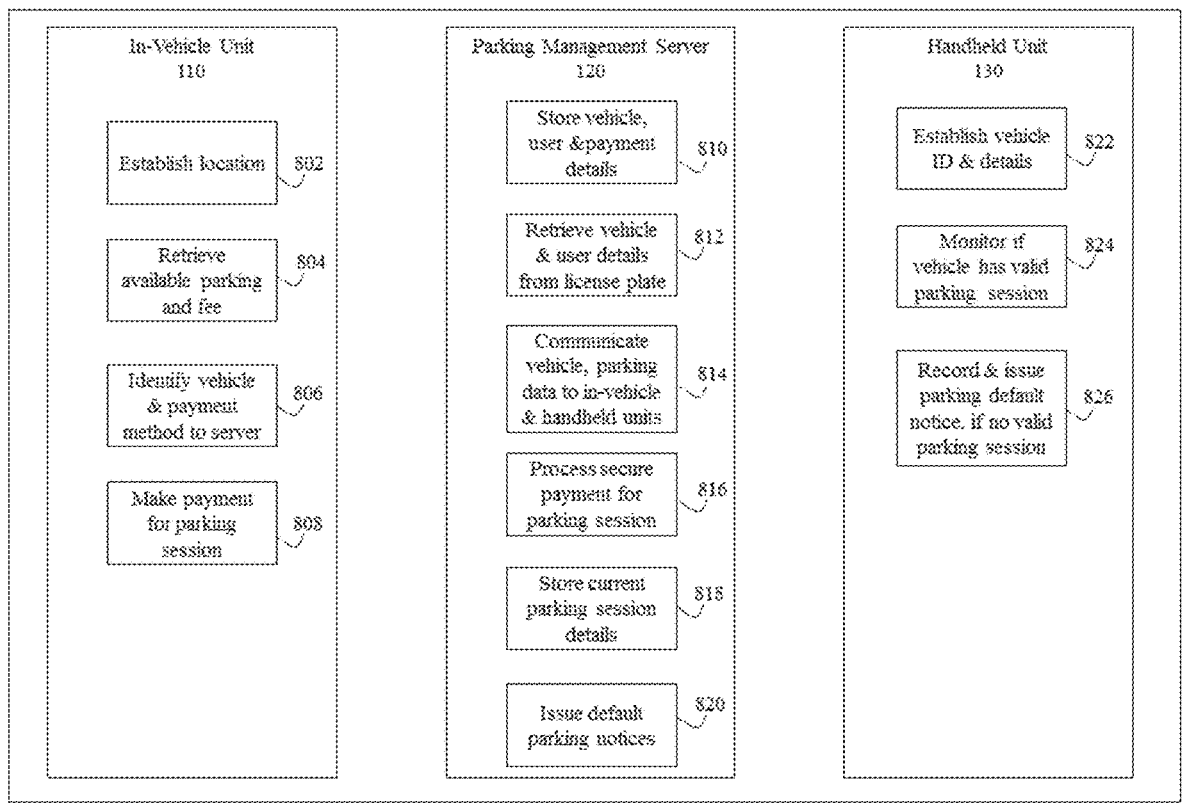
FIG. 10 shows a block diagram illustrating an overview of functions of major components of the integrated parking management system.

FIG. 10 shows a block diagram illustrating an overview of functions of major components of the integrated parking management system. In an embodiment, the in-vehicle-unit 110 comprises primary functions including establishing location, 802; retrieving available parking space and corresponding parking fee, 804; identifying vehicle details and communicating payment method to the parking management server, 806; making payment for the parking session, 808. The parking management server 120 comprises primary functions including storing vehicle, user and payment details, 810; retrieving vehicle, user details from license plate, 812; communicate vehicle, parking data to in-vehicle and handheld unit, 814; processing secure payment for the parking session, 816; storing current parking session details, 818; and issuing default parking notices, 820. The handheld unit 130 establishes vehicle identification and details, 822; monitoring of a valid parking session, 824; and recording, issuing parking default notice in case no valid parking session exists, 826.

In addition to the above mentioned features, the integrated parking management system of the present invention also includes additional features including remote vehicle position reporting, geographic route and navigation directions for the available parking spaces in the vicinity of current location, locality advertising and other position dependent facilities.

In an embodiment, the parking management server can provide geographically localized information to the in-vehicle unit, the information includes, but not limited to localized advertising of nearby events, facilities and retail establishments; and localized points of interest, wherein, the notification categories and notification preferences can be selected and customized by the vehicle user.

In an exemplary embodiment, the integrated parking management system of the present invention also notifies the vehicle user regarding nearby vacant parking spaces. The method involves in-vehicle unit 110 reporting the current location to the parking management server 120 via a mobile communication network and receiving a list of parking locations available in the vicinity, from the parking management server 120.

In another embodiment, the parking management server 120 is integrated with corporate and third party parking facility systems, such as airport, rail or other parking system to provide cashless parking management service. The method involves the following steps:

i) A vehicle incoming to the parking facility has its license plate photographed. The image is then forwarded to the parking management server 120. The parking management server 120 utilizes a license plate recognition software to register the time of entry and log against the vehicle account.

ii) The parking management server 120 sends confirmation to the in-vehicle unit 110, confirming entry to the parking zone.

iii) On exit from the facility the license plate is photographed and forwarded to the parking management server 120.

iv) The parking management server 120 then retrieves the vehicle data and entry time. The parking charge is calculated and forwarded to the in-vehicle unit 110, charge payment is then handled automatically and through manual payment options.

In an embodiment, the parking management server interrogates the geographic position of an in-vehicle unit via 3/4/5G mobile communication network and retrieves the geographic position of the vehicle. This information is used further to provide a number of facilities including but not limited to: Metropolitan authority vehicle tracking in the case of theft or misdemeanor; Federal ability to retrieve and utilize historic vehicle movement data; Company vehicle fleet management; Family member security monitoring and Locality advertising enablement.

In another embodiment, the parking management server reserves blocks of parking spaces for leasing or reserving parking bays for corporate entities or local events. Registered users are then advised of reservation by sending alerts or notification to the in-vehicle unit. In case of pre-booking and reserving a parking space for a future time, the parking management server allows the user to enter a parking location and reserves that location for a selected time. By one of the following methods: a) Entering a parking location code into the In-Vehicle unit; b) Selecting a location area from a zip code or locality on the In-Vehicle unit and c) Selecting and reserving a parking location via web-based service. The In-Vehicle unit will give directions to the pre-booked parking space.

In another embodiment, unauthorized movement of vehicle can also be monitored and reported. The in-vehicle unit determines movement of the vehicle from its position and facilitates actions including but not limited to: Contacting the parking management server and registering an unauthorized movement. The parking management server can send alerts to the registered user regarding an unauthorized movement through their registered, preferred contact method including SMS, social media, etc. Further the parking management server can send alerts to municipal authorities on the unauthorized movement of the vehicle. The parking management server can also receive information on unauthorized vehicle movement from a roadside parking beacon, which scans vehicle details and communicates to the parking management server.

In yet another embodiment, the in-vehicle unit of a registered vehicle comprises a single button or similar actuating means configured to remotely actuate automatic opening and closing of a garage door upon arrival of the vehicle in the vicinity of the garage door and automatic opening and closing of a driveway or gated community barrier and similar gateway access.

In an embodiment, the in-vehicle unit comprises a compact device similar to a mobile phone device that can be held in hand or removably attached to the interior of vehicle. FIG.

Figure 11A:
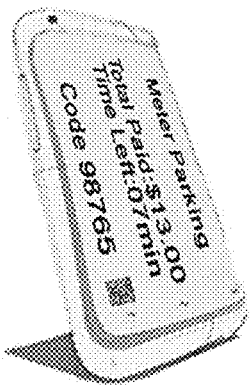
FIG. 11A shows a front view of the in-vehicle unit.
Figure 11C:
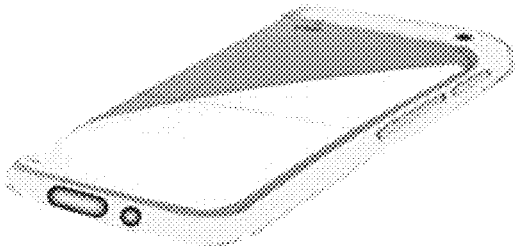
FIG. 11C shows a perspective view of the in-vehicle unit.
Figure 11B:
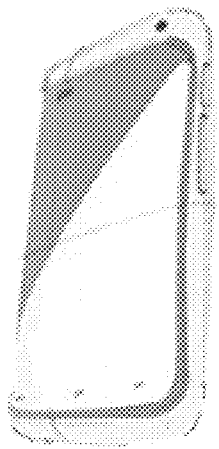
FIG. 11B shows a rear view of the in-vehicle unit.

11A shows a front view of the in-vehicle unit. FIG. 11B and FIG. 11C showing a rear view and a perspective view of the in-vehicle unit respectively.

Figure 12A:
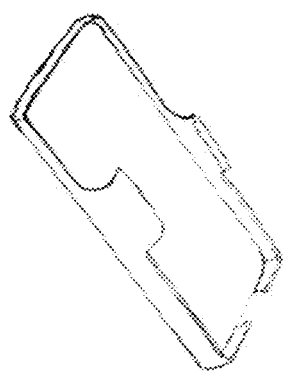
FIG. 12A shows a front view of a device cover for the in-vehicle unit.
Figure 12B:
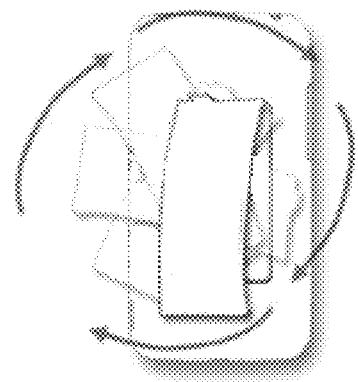
FIG. 12B shows a rear view of the device cover with a rotating clip.
Figure 12C:
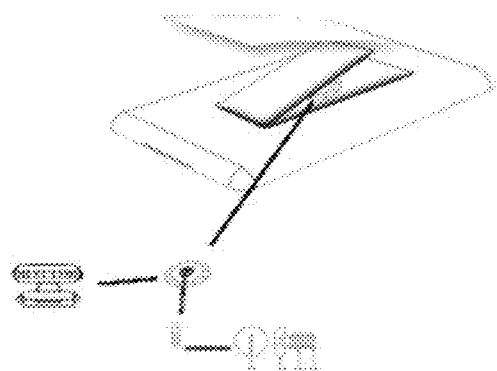
FIG. 12C shows a rear view of the device cover with exploded clip units.

The in-vehicle unit can be securely placed by sliding into a device cover. FIG. 12A shows a front view of the device cover comprising a recessed area configured to receive the in-vehicle unit. The device cover comprises an extendable clip on rear side, the clip is rotatable in different angles as shown in FIG. 12B. The clip is affixed with a screw unit as shown in exploded view of clip in FIG. 12C.

Figure 13A:
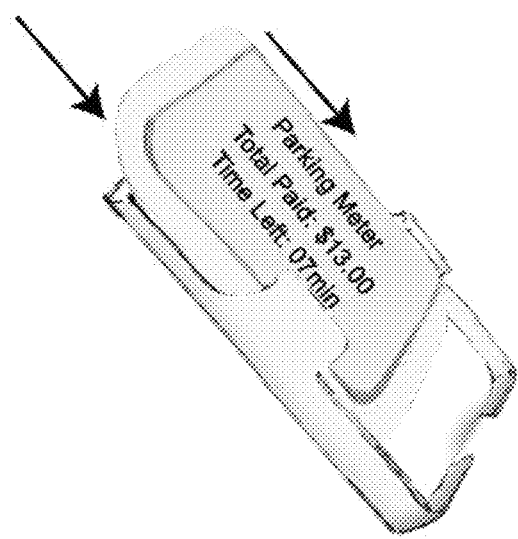
FIG. 13A shows the in-vehicle unit with exposed front face sliding into the device cover.
Figure 13B:
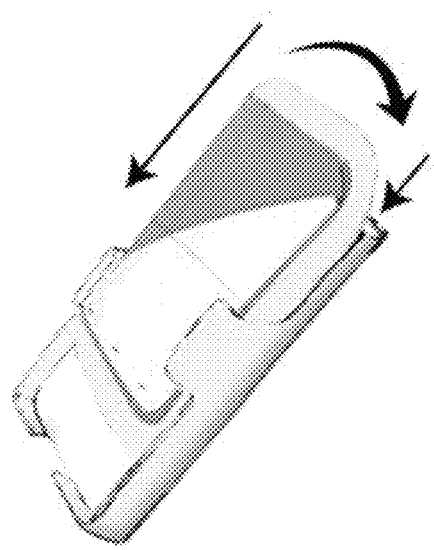
FIG. 13B shows the in-vehicle unit with exposed rear face sliding into the device cover.

FIG. 13A shows the in-vehicle unit with its front face exposed, sliding into the device cover. FIG. 13B shows the in-vehicle unit with its rear face exposed, sliding into the device cover, thus protecting the display screen on front face.

Figure 14A:
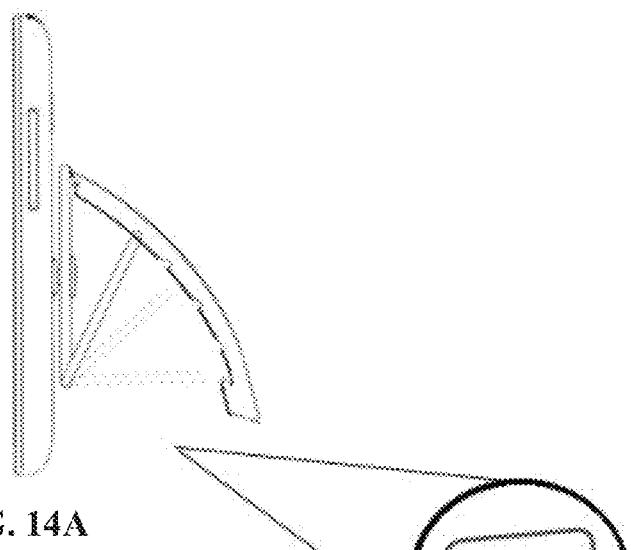
FIG. 14A shows a side view of the in-vehicle unit with the clip extended as a stand.
Figure 14B:
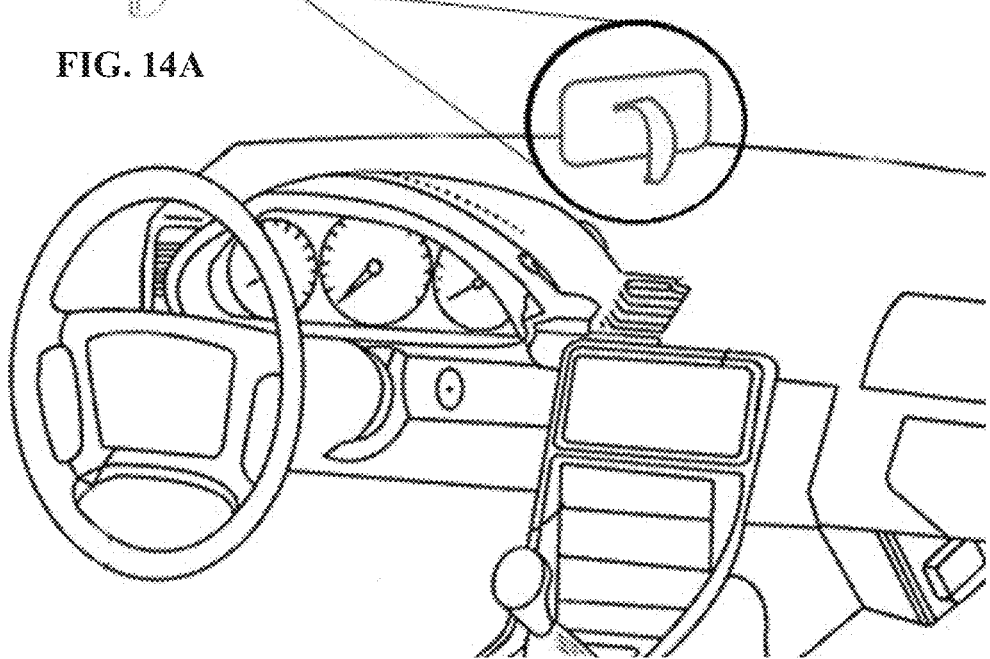
FIG. 14B shows the in-vehicle unit placed on dashboard using the clip extended as a stand.

The clip on the rear side of the device cover can be extended backwards to a horizontal position, which act as a supporting stand for the in-vehicle unit as shown in FIG. 14A. The in-vehicle unit can be placed on the dashboard of a vehicle using the extended clip as a stand, as shown in FIG. 14B.

Figure 15A:
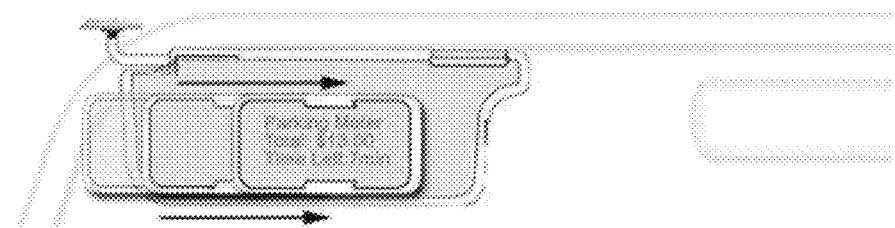
FIG. 15A shows the in-vehicle unit slid into the device cover attached to visor.
Figure 15B:
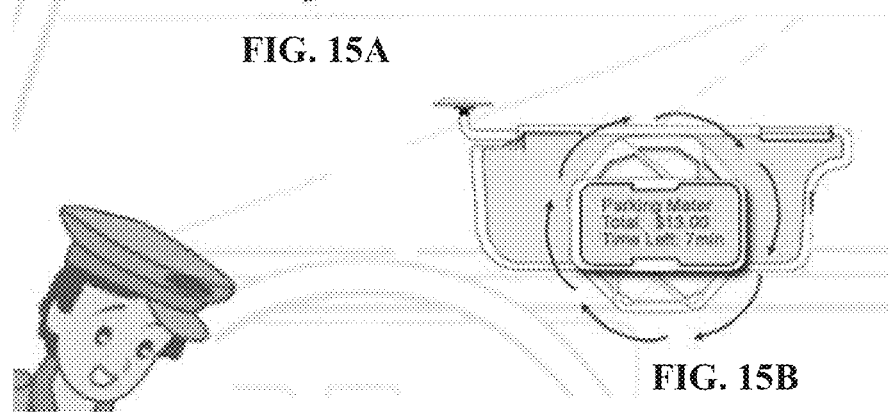
FIG. 15B shows the in-vehicle unit slid into rotatable device cover attached to visor.
Figure 15C:
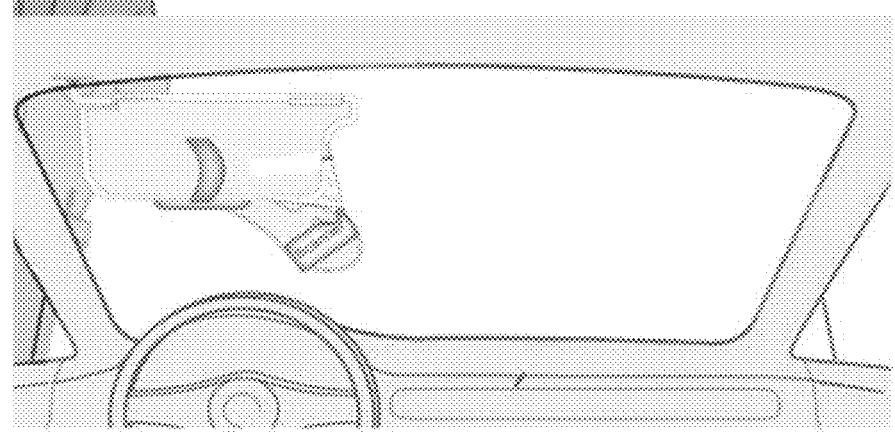
FIG. 15C shows the in-vehicle unit attached to the visor and being scanned.

The device cover with in-vehicle unit slid into it can be attached to a visor as shown in the FIG. 15A. The device cover is rotatable for user preferred view, once attached to an object such as the visor of vehicle as shown FIG. 15B. The in-vehicle unit attached to the visor can be scanned by parking attendant or parking enforcement authority using a scanner as shown in FIG. 15C.

Figure 16A:
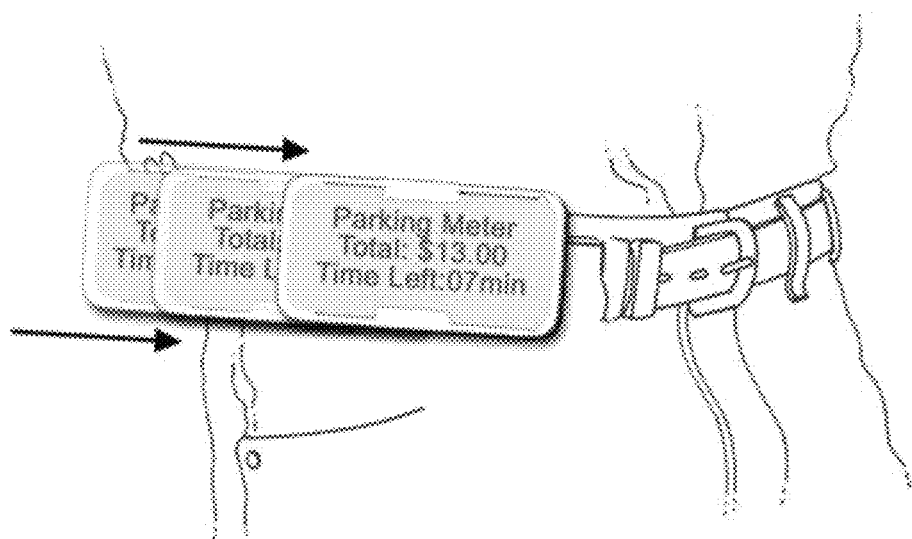
FIG. 16A shows the in-vehicle unit sliding into device cover attached to the belt.
Figure 16B:
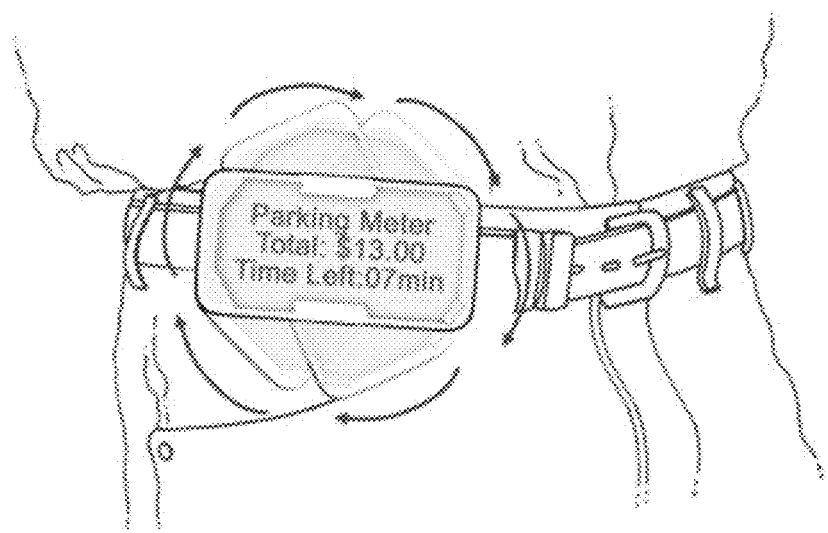
FIG. 16B shows the in-vehicle unit slid into rotatable device cover attached to the belt.

FIG. 16A and FIG. 16B shows the in-vehicle unit slid into the device cover attached to belt of an user using the clip and the device cover rotating by pivoting on the clip attached to belt of the user.

Figure 17:
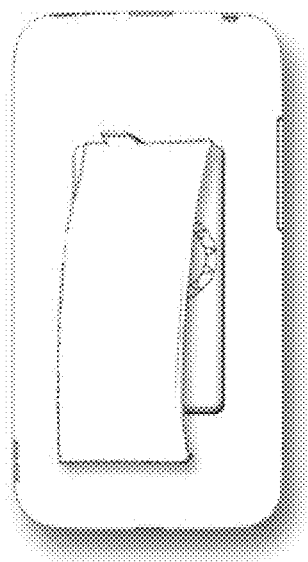
FIG. 17 shows a rear view of the device cover.
Figure 18:
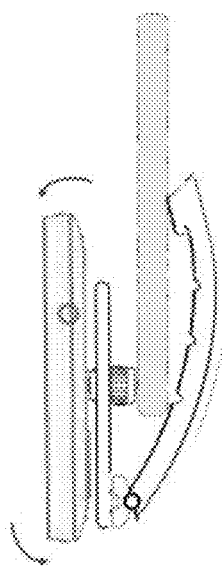
FIG. 18 shows a side view of the device cover attached to visor using the clip.
Figure 19:
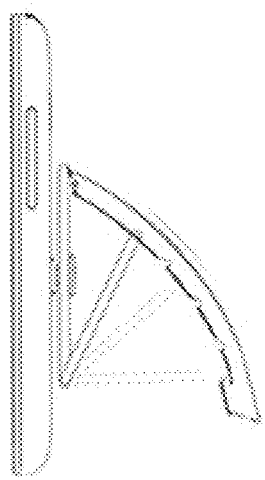
FIG. 19 shows a side view of the in-vehicle unit with the clip extended as a stand.

FIG. 17 shows a rear view of the device cover with an extendable clip. The device cover can be attached to a visor using the clip as shown in FIG. 18. The clip on the rear side of the device cover can be extended backwards to a horizontal position, which act as a supporting stand for the in-vehicle unit as shown in FIG. 19.

Figure 20A:
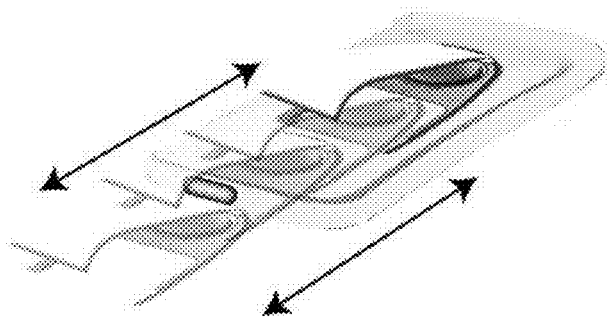
FIG. 20A shows the clip slid into the device cover.
Figure 20B:
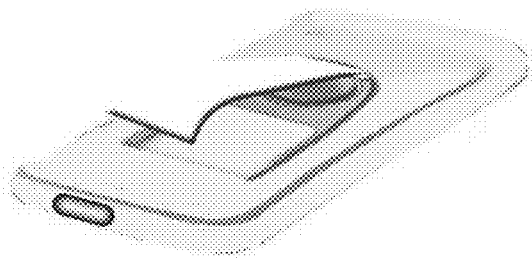
FIG. 20B shows the clip attached on the device cover.
Figure 20C:
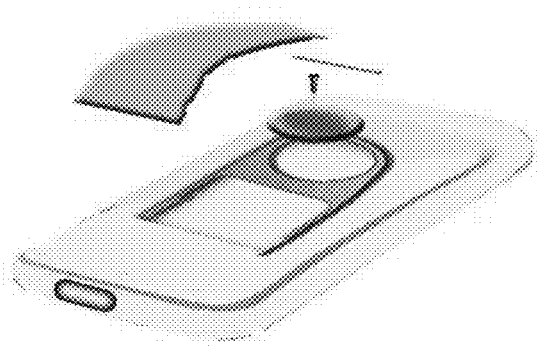
FIG. 20C shows a break down view of clip on the device cover.

FIG. 20A shows the clip being slid into the rear side of the device cover. FIG. 20B shows the clip fixed on the rear side of the device cover and FIG. 20C shows a breakdown view of the clip on the device cover.

What is claimed is:

1. An integrated parking management system for automated parking identification, parking fee payment and parking status monitoring comprising:
    an in-vehicle unit configured to determine a geographic position of a vehicle, the in-vehicle unit having two modes: (1) an in-vehicle mode wherein the in-vehicle unit is located within the vehicle, and (2) a portable mode wherein the in-vehicle unit is located outside of the vehicle;
    software;
    a parking management server configured to determine an available parking space and corresponding parking fee based on the geographic position of the vehicle received from the in-vehicle unit; and
    a handheld unit configured to determine validity of a parking status of the vehicle, and report to the parking management server;
    wherein a location of the in-vehicle unit, which is either located within the vehicle or in the portable mode outside of the vehicle, is determined by:
        i. docking station detection of whether the in-vehicle unit is inserted within the vehicle; and
        ii. detection by the in-vehicle unit by establishing a wireless connection to vehicle systems including vehicle audio;
    wherein, in response to detection of removal of the in-vehicle unit from the vehicle, the in-vehicle unit will establishes a 3G, 4G, and/or 5G connection with the parking management server, at least a part of geographic location dependent functions being temporarily suspended whilst the in-vehicle unit is in the portable mode; and
    wherein the in-vehicle unit and the handheld unit each comprise a respective computing device.

2. The integrated parking management system of claim 1, further comprising a parking beacon configured to sense the vehicle arriving to and/or exiting from the available parking space, and to determine a vehicle identification data.

3. The integrated parking management system of claim 1, wherein the in-vehicle unit further comprises a global positioning system module and a mobile phone network module for determining the geographic position of the vehicle.

4. The integrated parking management system of claim 1, wherein the in-vehicle unit further comprises a route planning software module providing navigation directions to a chosen parking space or a locality advertisement venue, through a display device and/or an audio device.

5. The integrated parking management system of claim 1, wherein the parking management server comprises a database updated with parking areas in a locality, parking fee, availability status of parking spaces, parking session details, registered user details and payment details.

6. The integrated parking management system of claim 1, wherein the parking management server comprises a database updated with venue places of interest.

7. The integrated parking management system of claim 6, wherein the portable mode of the in-vehicle unit provides route planning and directions to a chosen destination, the in vehicle unit is removable from the vehicle, current position-relevant directions are provided for the chosen destination, and return-to-vehicle directions are automatically provided.

8. The integrated parking management system of claim 1, wherein the parking management server provides selected alerts or notifications to a driver of the vehicle on a newly available parking space, parking duration, unavailability of a parking space, reasons for unavailability and additional estimated payment for extension of parking time.

9. The integrated parking management system of claim 1, wherein the in-vehicle unit further comprises an emergency switch or a panic button, which on actuation, contacts the parking management server, reports the vehicle position and triggers the parking management server to call an emergency service provider or preset emergency contacts.

10. A method for commencing and terminating a parking session, without user intervention, the method comprising:
    performing, by an integrated parking management system:
        i) identifying a stationary state of a vehicle for a predetermined time by an in-vehicle unit;
        ii) reporting a geo-location of the vehicle to a parking management server, which confirms whether the geo-location is within a parking bay;
        iii) commencing and recording a valid parking session by the parking management server, if the vehicle is within the parking bay;
        iv) communicating a movement of the vehicle from the parking bay by the in-vehicle unit; and v) terminating the parking session and calculating a parking fee by the parking management server, and communicating the calculated parking fee to the in-vehicle unit;

wherein the integrated parking management system comprises:
the in-vehicle unit, which is configured to determine a geographic position of the vehicle, the in-vehicle unit having two modes: (1) an in-vehicle mode wherein the in-vehicle unit is located within the vehicle, and (2) a portable mode wherein the in-vehicle unit is located outside of the vehicle;
software;
the parking management server, which is configured to determine an available parking space and corresponding parking fee based on the geographic position of the vehicle received from the in-vehicle unit; and
a handheld unit configured to determine validity of a parking status of the vehicle, and report to the parking management server;
wherein a location of the in-vehicle unit, which is either located within the vehicle or in the portable mode outside of the vehicle, is determined by:
  i. docking station detection of whether the in-vehicle unit is inserted within the vehicle; and
  ii. detection by the in-vehicle unit by establishing a wireless connection to vehicle systems including vehicle audio;
wherein, in response to detection of removal of the in-vehicle unit from the vehicle, the in-vehicle unit establishes a 3G, 4G, and/or 5G connection with the parking management server, at least a part of geographic location dependent functions being temporarily suspended whilst the in-vehicle unit is in the portable mode; and
wherein the in-vehicle unit and the handheld unit each comprise a respective computing device.

11. The method of claim 10, further comprising:
i) sensing an arrival of the vehicle to the parking bay by a parking beacon;
ii) scanning of vehicle identification data for determining a registered user;
iii) commencing automatically the valid parking session by the parking management server, if the vehicle identification data matches with a registered user;
iv) communicating movement of the vehicle from the parking bay by the parking beacon;
v) terminating the parking session and calculating the parking fee by the parking management server; and
vi) communicating the parking fee to the in-vehicle unit.

12. A method for automatically paying municipal toll charge, third party route access charges and congestion zone entry charges, the method comprising:
performing, by an integrated parking management system:
  reporting a vehicle position to a parking management server by an in-vehicle unit;
  identifying a registered third party route access or municipal toll charge locality, applicable to the vehicle, by the parking management server;
  notifying zone entry charge to the in-vehicle unit upon entry of the vehicle into a chargeable zone based on user preferences; and
  automatic payment of the zone entry charge, or notifying a user to pay the zone entry charge;
wherein the integrated parking management system comprises:
the in-vehicle unit, which is configured to determine a geographic position of the vehicle, the in-vehicle unit having two modes: (1) an in-vehicle mode wherein the in-vehicle unit is located within the vehicle, and (2) a portable mode wherein the in-vehicle unit is located outside of the vehicle;
software:
the parking management server, which is configured to determine an available parking space and corresponding parking fee based on the geographic position of the vehicle received from the in-vehicle unit; and
a handheld unit configured to determine validity of a parking status of the vehicle, and report to the parking management server;
wherein a location of the in-vehicle unit, which is either located within the vehicle or in the portable mode outside of the vehicle, is determined by:
  i. docking station detection of whether the in-vehicle unit is inserted within the vehicle; and
  ii. detection by the in-vehicle unit by establishing a wireless connection to vehicle systems including vehicle audio;
wherein, in response to detection of removal of the in-vehicle unit from the vehicle, the in-vehicle unit establishes a 3G, 4G, and/or 5G connection with the parking management server, at least a part of geographic location dependent functions being temporarily suspended whilst the in-vehicle unit is in the portable mode; and
wherein the in-vehicle unit and the handheld unit each comprise a respective computing device.

13. The method of claim 12, further comprising:
polling of compatible chargeable zone gateway access communication devices using onboard RF communication by the in-vehicle unit for determining zone charges;
notifying the zone entry charge to the in-vehicle unit upon the entry of the vehicle into the chargeable zone based on the user preferences; and
automatic payment of the zone entry charge, or notifying the user to pay the zone entry charge.

14. The method of claim 13, further comprising: leasing and reserving parking bays for corporate entities or local events, wherein the parking management server reserves blocks of parking spaces, and users are advised of reservation.

15. A method of monitoring validity of a parking session of a parked vehicle, the method comprising:
performing, by an integrated parking management system:
  establishing wireless communication with an in-vehicle unit of the parked vehicle by a handheld unit;
  scanning vehicle registration data, and checking for the presence of a valid parking session;
  forwarding a parking default and the vehicle registration data, on an invalid parking session to a parking management server via a mobile network module;
  retrieving vehicle user details by the parking management server upon receiving a notification on the parking default; and
  sending a parking default notice to the handheld unit, that is printed or mailed to user of the vehicle;
wherein the integrated parking management system comprises:
the in-vehicle unit, which is configured to determine a geographic position of the vehicle, the in-vehicle unit having two modes: (1) an in-vehicle mode wherein the in-vehicle unit is located within the vehicle, and (2) a portable mode wherein the in-vehicle unit is located outside of the vehicle;

software;

the parking management server, which is configured to determine an available parking space and corresponding parking fee based on the geographic position of the vehicle received from the in-vehicle unit; and the handheld unit, which is configured to determine validity of a parking status of the vehicle, and report to the parking management server;

wherein a location of the in-vehicle unit, which is either located within the vehicle or in the portable mode outside of the vehicle, is determined by:
  i. docking station detection of whether the in-vehicle unit is inserted within the vehicle; and
  ii. detection by the in-vehicle unit by establishing a wireless connection to vehicle systems including vehicle audio;

wherein, in response to detection of removal of the in-vehicle unit from the vehicle, the in-vehicle unit establishes a 3G, 4G, and/or 5G connection with the parking management server, at least a part of geographic location dependent functions being temporarily suspended whilst the in-vehicle unit is in the portable mode; and wherein the in-vehicle unit and the handheld unit each comprise a respective computing device.

16. The method of claim 15, wherein the handheld unit receives the vehicle registration data via an integrated scanning device, a license plate recognition system, or enquiring with the in-vehicle unit.

17. The method of claim 15, wherein the parking management server automatically notifies a nearby handheld unit on occurrence of parking default, if no valid parking session is recorded for an occupied parking bay, based on parking location and duration data received from a satellite imaging or a parking beacon.

18. The method of claim 15, wherein the parking management server sends a request for removal of the vehicle to the handheld unit upon confirmation of the parking default.

19. A method for determining if a vehicle is moved without authority and reporting the occurrence, comprising:
performing, by an integrated parking management system:
  i) contacting a parking management server and registering an unauthorized movement of the vehicle;
  ii) the parking management server sends alerts to a registered user of the unauthorized movement, by the registered, preferred contact method of the registered user, including contact through SMS and social media;
  iii) the parking management server sends alerts to municipal authorities on the unauthorized movement; and
  iv) the parking management server retrieves vehicle tracking data and forwards the vehicle tracking data to the municipal authorities in accordance with requirements;

wherein the integrated parking management system comprises:
an in-vehicle unit configured to determine a geographic position of the vehicle, the in-vehicle unit having two modes: (1) an in-vehicle mode wherein the in-vehicle unit is located within the vehicle, and (2) a portable mode wherein the in-vehicle unit is located outside of the vehicle;

software;

the parking management server, which is configured to determine an available parking space and corresponding parking fee based on the geographic position of the vehicle received from the in-vehicle unit; and a handheld unit, which is configured to determine validity of a parking status of the vehicle, and report to the parking management server;

wherein a location of the in-vehicle unit, which is either located within the vehicle or in the portable mode outside of the vehicle, is determined by:
  i. docking station detection of whether the in-vehicle unit is inserted within the vehicle; and
  ii. detection by the in-vehicle unit by establishing a wireless connection to vehicle systems including vehicle audio;

wherein, in response to detection of removal of the in-vehicle unit from the vehicle, the in-vehicle unit establishes a 3G, 4G, and/or 5G connection with the parking management server, at least a part of geographic location dependent functions being temporarily suspended whilst the in-vehicle unit is in the portable mode; and wherein the in-vehicle unit and the handheld unit each comprise a respective computing device.

\* \* \* \* \*